United States Patent
Dybsetter

(10) Patent No.: US 7,908,406 B2
(45) Date of Patent: Mar. 15, 2011

(54) INTERFACE ARCHITECTURE FOR FACILITATING COMMUNICATION REGARDLESS OF PROTOCOL

(75) Inventor: Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/624,585

(22) Filed: Jan. 18, 2007

(65) Prior Publication Data

US 2008/0126587 A1  May 29, 2008

Related U.S. Application Data

(60) Provisional application No. 60/805,458, filed on Jun. 21, 2006.

(51) Int. Cl.
*G06F 3/00* (2006.01)
*G06F 13/00* (2006.01)

(52) U.S. Cl. .............. 710/11; 710/8; 710/104

(58) Field of Classification Search .......... 710/8, 104, 710/11, 14
See application file for complete search history.

(56) References Cited

U.S. PATENT DOCUMENTS

| | | | | |
|---|---|---|---|---|
| 4,276,594 A | * | 6/1981 | Morley | 713/600 |
| 4,807,282 A | * | 2/1989 | Kazan et al. | 379/284 |
| 5,357,625 A | * | 10/1994 | Arends | 710/10 |
| 5,428,526 A | * | 6/1995 | Flood et al. | 700/12 |
| 5,548,782 A | * | 8/1996 | Michael et al. | 710/15 |
| 5,655,148 A | * | 8/1997 | Richman et al. | 710/8 |
| 5,905,873 A | * | 5/1999 | Hartmann et al. | 709/249 |
| 6,477,611 B1 | * | 11/2002 | Chang | 710/313 |
| 6,731,607 B1 | * | 5/2004 | Mantin | 370/254 |
| 7,072,356 B1 | * | 7/2006 | Clancy et al. | 370/465 |
| 2003/0093598 A1 | * | 5/2003 | Park | 710/63 |
| 2003/0174549 A1 | * | 9/2003 | Yaguchi et al. | 365/200 |
| 2003/0221061 A1 | * | 11/2003 | El-Batal et al. | 711/114 |
| 2005/0128114 A1 | * | 6/2005 | Case et al. | 341/139 |
| 2005/0210177 A1 | * | 9/2005 | Norden | 710/317 |
| 2007/0035276 A1 | * | 2/2007 | Webjorn | 320/114 |

* cited by examiner

*Primary Examiner* — Chun-Kuan Lee
*Assistant Examiner* — Farley J Abad
(74) *Attorney, Agent, or Firm* — Maschoff Gilmore & Israelsen

(57) ABSTRACT

An architecture and method in an integrated circuit for configuring a controller to facilitate communication with a plurality of external device interfaces. The integrated circuit includes a processor, a first memory, a second memory, including a plurality of dedicated memory blocks containing configuration data, and a plurality of external device interfaces. The processor is configured to write a microcode instruction to the first memory. The controller is configured to read the microcode instruction in the first memory and as a result access one of the plurality of dedicated memory blocks. Next, the controller processes the configuration data in the dedicated memory block according to the microcode instruction. As a result, the controller is configured to communicate with one of the plurality of external device interfaces. This process may be repeated as needed to configure the controller to communicate with different device interfaces using different communication protocols.

21 Claims, 3 Drawing Sheets

INTERFACE ARCHITECTURE FOR FACILITATING COMMUNICATION REGARDLESS OF PROTOCOL

CROSS-REFERENCE TO RELATED APPLICATIONS

This application claims the benefit of U.S. Provisional Application No. 60/805,458, filed Jun. 21, 2006, which is incorporated herein by reference in its entirety.

BACKGROUND OF THE INVENTION

1. The Field of the Invention

The present invention relates generally to integrated circuits. More specifically, the present invention relates to mechanisms for configuring a serial controller to facilitate communication with multiple external device interfaces regardless of protocol.

2. Background and Relevant Technology

Electronic and computing technology has transformed the way that we work and play. Many electronic or computing systems rely on a variety of components that cooperatively interact to perform complex functions. Many of these components are integrated circuit chips.

The integrated circuits include the complex circuitry that performs the complex functions. The integrated circuits tend to be composed of a semiconductor (e.g., silicon) or dielectric (e.g., sapphire) upon which the circuitry as fabricated.

Integrated circuits often come in a package that allows the integrated circuit chip to interface with the printed circuit board, and provides some level of protection for the integrated circuit chip. The protection might include Electro-Magnetic Interference (EMI) shielding, temperature dissipation structures, and/or physical barrier protection against inadvertent contacting the delicate circuit structures on the chip. The package includes a number of pins that are appropriately positioned such that the package may be plugged into a socket on the integrated circuit board. Many of these pins act as an external device interface that allows the integrated circuit chip to send signals to and receive signals from other electrical components in an electrical system.

Typically, the external device interface consists of external connections that are configured for a particular external device. For example, the external device interface may be a two wire interface configured to communicate with an external chip or device using the I²C communication protocol.

In many applications, an integrated circuit chip may include a master serial controller that is used to control the external device interface. For example, the serial controller may provide data to the I²C interface for communication to the external device and may receive signals from the external device interface that have been received from the external device.

Many integrated circuit chips, however, communicate with multiple external devices and therefore have multiple external interfaces. For example, a chip may have the I²C interface discussed above and a Serial Peripheral Interface (SPI) interface. The SPI interface is a common four wire interface. In that case, the chip would need two master serial controllers to control both of the different interfaces. If the chip had several external device interfaces, then the number of necessary master serial controllers would increase according to the number of interfaces.

Having a single serial controller for each device interface is expensive. In addition, valuable chip space is needlessly used by each of the individual controllers, which can drive up fabrication costs. Also, valuable chip resources are consumed to support each serial controller. Therefore, what would be advantageous is a mechanism to configure a single serial controller to facilitate communication with multiple external device interfaces.

BRIEF SUMMARY

The foregoing problems with the prior state of the art are overcome by the principles of the present invention, which are directed towards an architecture and method for an integrated circuit to configure a controller to facilitate communication with multiple external device interfaces. The integrated circuit includes a microprocessor, a first memory, a second memory that includes a plurality of dedicated memory blocks containing interface configuration data, a controller, and multiple external device interfaces supporting different communication protocols that couple the integrated circuit to multiple external devices.

The processor writes command request control data to the first memory. The control data may include a pointer to one of the plurality of dedicated memory blocks in the second memory, and a controller command. The controller reads the control data written in the first memory, and as a result, accesses the interface configuration data stored in the dedicated memory block that corresponds to the pointer. The controller then processes the access configuration data as directed by the controller command. Finally, as a result of the processing, the controller is configured to communicate with one of the multiple external device interfaces using the communication protocol supported by the device interface. This process may be repeated as necessary to configure the controller to communicate with a different external device interface using a different protocol.

Accordingly, the principals of the present invention allow for a single architecture to be used when configuring the controller to communicate with multiple external devices using different communication protocols. This process saves on processor resources as the processor need not actively control the configuration process. The processor need only write the microcode instruction to the first memory and then simply monitor the process. In addition, less integrated circuit resources are needed to support the configuration process. For example, because the second memory includes dedicated memory blocks, microcode resources are saved as configuration microcode need only be written to those dedicated blocks. This removes the need for new configuration microcode every time a configuration process takes place. Accordingly, cost is reduced and chip space is saved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The principles of the present invention relate to an architecture and method in an integrated circuit for configuring a controller to facilitate communication with a plurality of external device interfaces. The integrated circuit includes a processor, a first memory, a second memory including a plurality of dedicated memory blocks containing configuration data, and a plurality of external device interfaces. The plurality of external device interfaces allows the integrated circuit to communicate with various external devices that support different communication protocols.

The processor writes command request control data to the first memory. The controller is configured to read the control data in the first memory and as a result access one of the plurality of dedicated memory blocks. Next, the controller processes the configuration data in the dedicated memory block according to the command request. As a result of the processing, the controller is configured to communicate with one of the plurality of external device interfaces using the communication protocol supported by the external device interface. This process may be repeated as needed to configure the controller to communicate with different device interfaces using different communication protocols. An example operational environment will first be described. Then, the operation in accordance with the invention will be described with respect to the operational environment.

Figure 1:
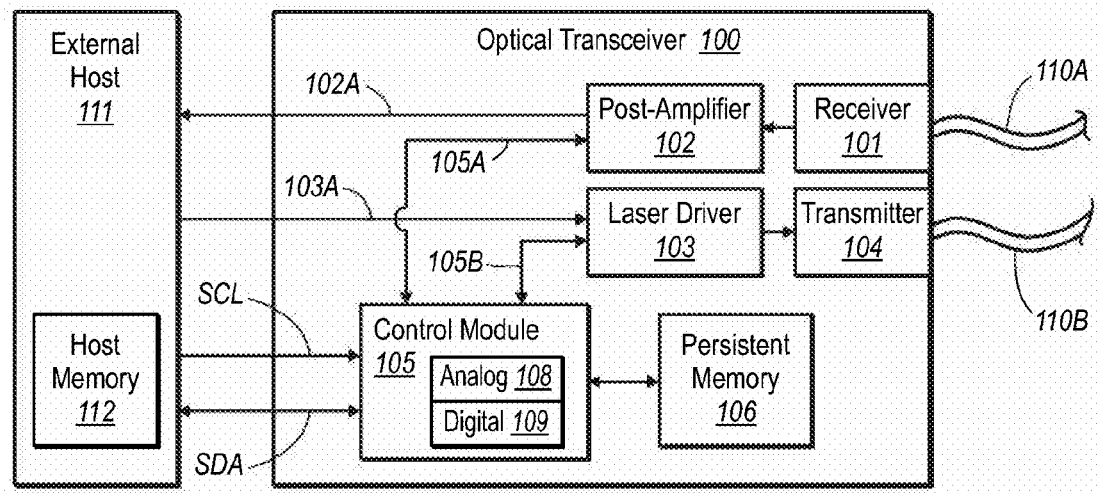
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host as represented by arrow 102A. The external host may be any computing system capable of communicating with the optical transceiver 100. The external host may contain a host memory 112 that may be a volatile or non-volatile memory source. In one embodiment, the optical transceiver 100 may be a printed circuit board or other components/chips within the host, although this is not required.

The optical transceiver 100 may also receive electrical signals from the host for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
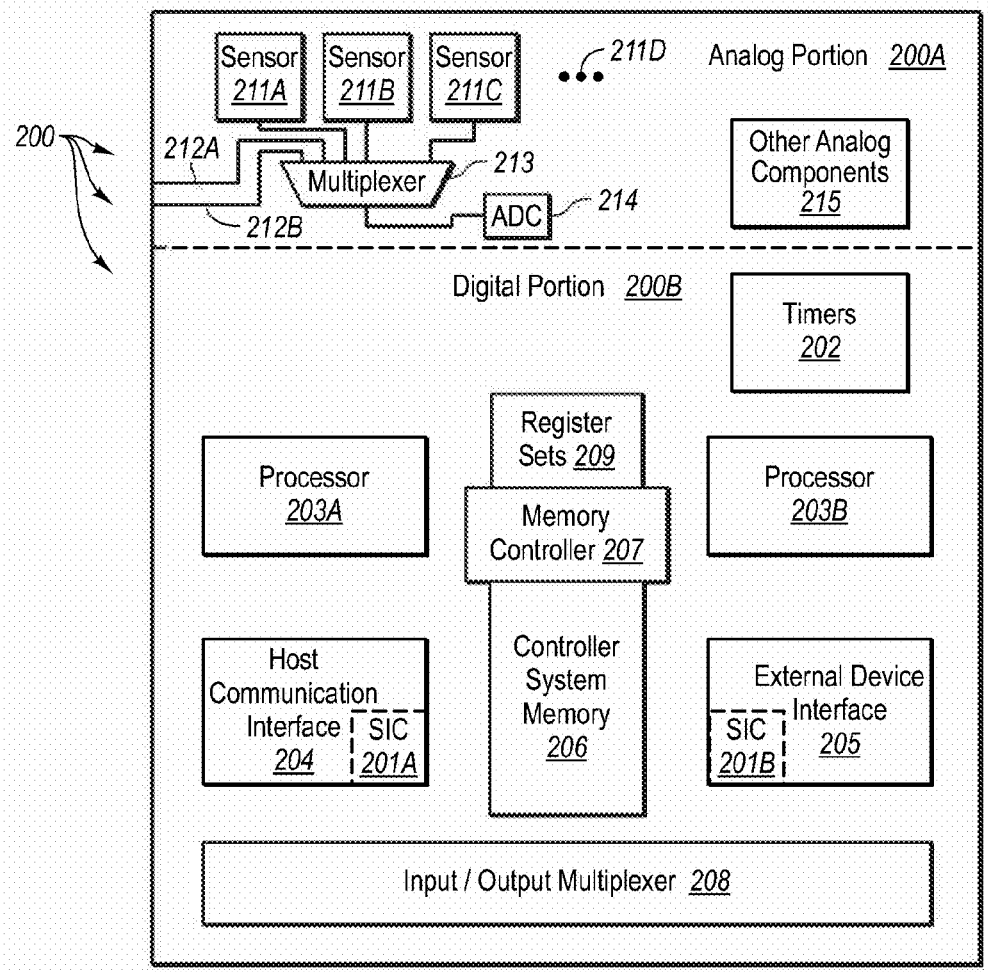
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100A. Alternatively, the registers may hold data selecting operational parameters for comparison. Additionally, the registers may be memory mapped to the various components of optical transceiver 100A for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. The principles of the present invention will be discussed with reference to the environment described in relation to FIGS. 1 and 2.

Figure 3:
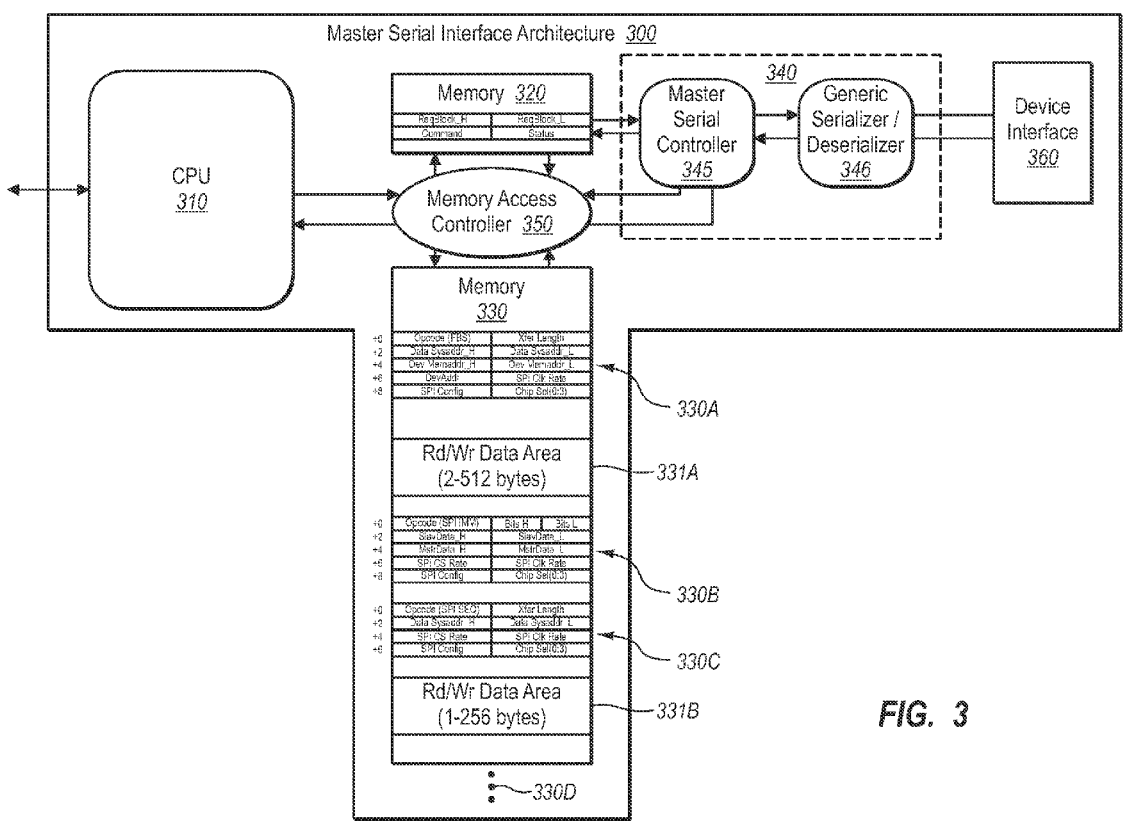
FIG. 3 schematically illustrates an integrated circuit architecture in which embodiments of the present invention may be practiced.

Referring again to the figures, FIG. 3 shows a portion of an integrated circuit 300. Integrated circuit 300 may correspond to a portion of control module 200 of FIG. 2, although this is not required. Integrated circuit 300 may be fabricated by any method known to one skilled in the art, and may include any number of terminals, some of which may be structured to be external device interfaces. The precise number of terminals and construction of integrated circuit 300 are unimportant to the principals of the present invention.

Integrated circuit 300 includes a microprocessor 310, which may correspond to microprocessors 203A and 203B of FIG. 2. Microprocessor 310 may also be any general purpose microprocessor with the ability to write microcode instructions to a memory. Microprocessor 310 may also poll a memory location or receive an interrupt in order to ascertain the status of operations in integrated circuit 300.

Integrated circuit 300 also includes a first memory location 320. In an exemplary embodiment, first memory location 320 may be a register, which may correspond to an individual register in register sets 209 of FIG. 2. However, first memory location 320 may also be random access memory (RAM), such as controller system memory 206 of FIG. 2, non-volatile memory such as persistent memory 106 of FIG. 1, a processor, a flip-flop, or any other type of memory. It is not important to the principles of the present invention which type of memory source is used. Incidentally, the terms first, second, and so forth are not used in the claims or in this description to imply any sort of sequential ordering, but merely to distinguish one item from another.

First memory 320 is configured to receive command request control data from microprocessor 310. This control data may include a pointer to one of a plurality of dedicated memory blocks in a second memory 330. It may also include a controller command that directs how a controller 340 processes the configuration data found in the dedicated memory blocks of second memory 330. The controller command may include a command to save the configuration data, a command to load the configuration data, or a command to execute the configuration data. In some embodiments, the controller command may also include any combination of the three.

As mentioned, integrated circuit 300 also includes a second memory 330, which in some embodiments may be the same as first memory 320. Second memory 330 may be RAM such as controller system memory 206 of FIG. 2. However, second memory 330 may also be register, such as a register in register sets 209 of FIG. 2, persistent memory such as persistent memory 106 of FIG. 1, a flip-flop, or any other type of memory device. Second memory 330 includes a number of dedicated memory blocks, 330A, 330B, 330C, and potentially more as designated by vertical ellipse 330D. Second memory 330 may also include one or more read and write data areas as shown in FIG. 3 as data areas 331A and 331B. The read and write data areas are used by the integrated circuit 300 to store data that is received from an external device, and to store information that will be provided to the external device.

The dedicated memory blocks 330A, 330B, 330C, and 330D are configured to contain configuration data that is used by integrated circuit 300 to configure a controller to communicate with the various external device interfaces using a communication protocol. The number of dedicated memory blocks may correspond to the number of different communication protocols with which integrated circuit 300 will communicate. For example, as shown in FIG. 3, there are three dedicated memory blocks. The first dedicated memory block, block 330A, may contain configuration data for configuring the controller 340 to communicate with a Finisar Serial Bus (FSB) device. FSB is a proprietary two wire interface, and is described in commonly-assigned co-pending U.S. patent application Ser. No. 10/814,024 filed Mar. 31, 2004, and incorporated herein by reference in its entirety. In like manner, dedicated memory blocks 330B and 330C may contain configuration data for configuring the controller 340 to communicate with a Serial Peripheral Interface (SPI) device. Additional dedicated memory block 330D may contain configuration data for configuring the controller 340 to communicate using other types of communication protocols such as I²C.

The dedicated memory blocks are typically used to store the configuration data. As such, there is no need for microprocessor 310 to repeatedly write command request control data to second memory 330 every time a configuration change is needed. Instead, microprocessor 310 is able to write a single control data to first memory 320 that may be accessed by the controller 340 as will be explained further below. As a result, valuable control data and processor resources are saved.

The configuration data stored in dedicated memory blocks 330A, 330B, 330C and potentially 330D may contain several bytes of instructions that are used to configure the controller 340 to communicate with an external device interface. For example, looking at FSB dedicated memory block 330A, the first byte of data contains an operation code. The operation code directs the controller 340 to read or write data received from the external device interface, or to read or write data provided to the external device interface. A second byte of configuration data includes the total number of bytes of data that are to be transferred between the controller and the external device interface. The third and fourth byte of data may contain the address of the read and write data area 331A. This address is used by controller 340 to find the data that it will be reading and writing as it communicates with the external device interface as well as the area it will write data received from the external device interface.

The configuration data also may contain bytes of information that include a memory address and a device address for an external device coupled to the integrated circuit. These bytes of data direct controller 340 to select the correct external device to communicate with through the external device interface. There may also be bytes of data defining chip selects and other configuration data. Dedicated data blocks 330B and 330C contain similar configuration data as that which has been described for dedicated memory block 330A.

As has been mentioned, integrated circuit 300 includes a controller 340, which may correspond to serial interface controller 201B of FIG. 2. Controller 340 is configured to read a microcode instruction written in first memory 320 by microprocessor 310, and is also configured to have direct memory access to the dedicated memory blocks 330A through 330D in second memory 330. Once controller 340 has accessed and processed the configuration data from the dedicated memory blocks in second memory 330, it will be configured to communicate with an external device interface using the protocol supported by that external device interface. Controller 340 is also configured to receive data from an external device through the external device interface and to provide that received data to second memory 330 where it may be accessed and processed by other components of integrated circuit 300. The controller 340 may be a state machine that is configured to change states upon processing the configuration data.

Controller 340 may include a serial controller 345 and a generic serializer/deserializer 346. The serial controller 345 and the serializer/deserializer 346 may be one component in some embodiments, or they may be separate components in other embodiments. The serial controller 345 accesses the data from the read and write data blocks of second memory 330 as has been explained. The serial controller 345 may then provide this data to serializer/deserializer 346 for conversation to serial data. The serial data is then provided to the selected external device interface for communication with an external device. The selected external device interface may provide serial data to the serializer/deserializer 346 where it's converted from serial data. This data may then be provided to serial controller 345 where it may be provided to second memory 330 for use in other integrated circuit 300 purposes.

Integrated circuit 300 may also include external device interfaces 360. The external device interfaces 360 may be I/O pins that have been previously configured to support various communication protocols. An example of configuring I/O pins is described in commonly assigned co-pending U.S. patent application Ser. No. 10/970,530 filed Oct. 21, 2004, which is incorporated herein by reference in its entirety. External device interfaces 360 are structured to connect the integrated circuit 300 to multiple external devices. The external device interfaces 360 support different communication protocols depending upon how they have been configured. For example, one external device interface may support the FSB communication protocol, while another may support the SPI communication protocol, or the I²C communication protocol.

In some embodiments, integrated circuit 300 may also include a memory access controller 350, which may correspond to memory controller 207 of FIG. 2. Memory access controller 350 is used to facilitate controller 340 access to the second memory 330, and to first memory 320. It is also used to facilitate microprocessor 310 access to first memory 320 and second memory 330.

Having described a specific architecture of integrated circuit 300 with respect to FIG. 3, it will be understood by those skilled in the art that there are countless other architectures that may also be used for the principles of the present invention. As mentioned above, the principles of the present invention are not to be limited by any specific environment or architecture.

Figure 4:
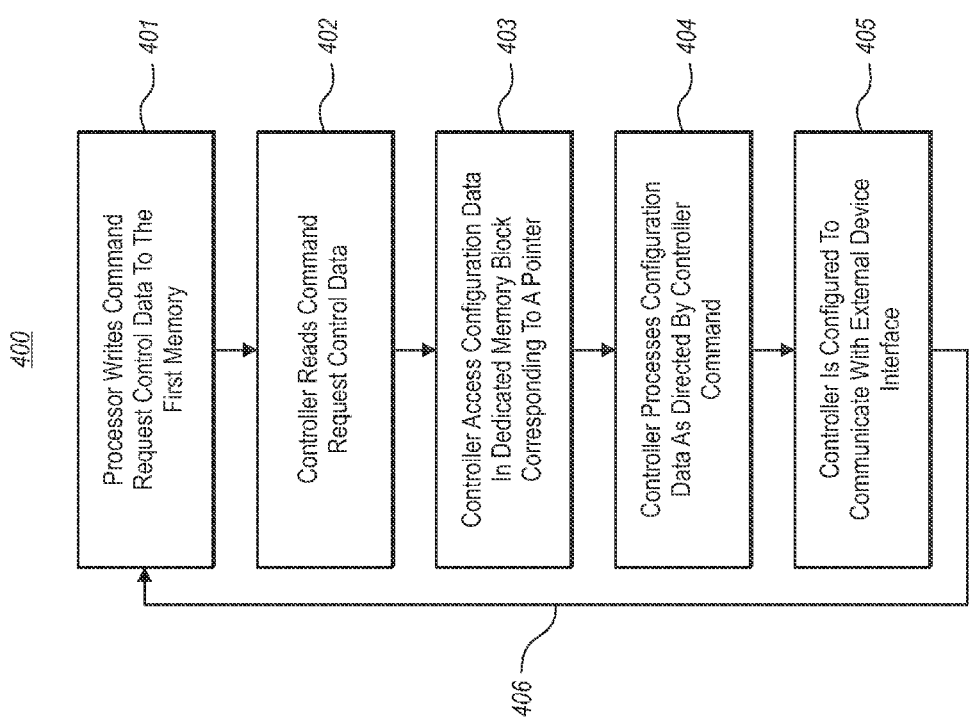
FIG. 4 illustrates a flowchart of a method for configuring a controller to facilitate communication with multiple external device interfaces regardless of protocol according to the principles of the present invention.

Referring to FIG. 4, a method 400 for configuring a controller to facilitate communication with multiple external device interfaces regardless of protocol is shown. This method will be described with frequent reference to the specific architecture described in relation to FIG. 3. First, a processor writes command request control data to a first memory (act 401). As mentioned previously, the control data may include a pointer to one of the plurality of dedicated memory blocks in second memory 330. It may also include a controller command that directs how controller 340 processes the configuration data found in the dedicated memory blocks of second memory 330. For example, suppose that microprocessor 310 desires to communicate with an external device using the FSB communication protocol. Processor 310 will write control data to first memory 320 that includes a pointer that points to the FSB configuration data found in dedicated memory block 330A, as well as the controller command. The control command may direct controller 340 to first load the FSB configuration data, and then execute the configuration data.

The controller will then read the command request that has been written to the first memory location (act 402). For example, in the example embodiment, controller 340, with the aid of memory access controller 350, will read the command request control data written in first memory 320.

The controller will next access the configuration data in the dedicated memory block corresponding to the pointer in the control data (act 403). For example, in the example embodiment, controller 340, with the aid of memory access controller 350, will access memory block 330A, containing the configuration data for the FSB protocol.

Having accessed the configuration data, the controller processes the configuration data as directed by the controller command in the control data (act 404). For example, master serial controller 340 may load the configuration data found in dedicated memory block 330A and then execute that configuration data.

Upon processing the configuration data, the controller will be configured to communicate with an external device interface using the protocol supported by that external device interface (act 405). For example, in the example embodiment, controller 340 will be configured to communicate with an external device interface that supports the FSB communication protocol. Serial controller 345 will be able to access data from the read/write data area 331A and provide that data to the generic serializer/deserializer 346. Generic serializer/deserializer 346 will serialize the data and provide it to the FSB external interface, where it will then be provided to an external FSB device. In addition, controller 340 is also configured to receive data from the FSB external device interface. For example, the external device interface may provide serial data to the generic serializer/deserializer 346, which may then deserialize the data and provide it to serial controller 345. Serial controller 345 may then provide this data to the read/write data area 331A, where this data may later be accessed by the microcontroller 310, or other integrated circuit 300 components.

In some embodiments, on the completion of the communication process, controller 340 is configured to write a status command to first memory 320. While polling this memory location, microcontroller 310 may read the status control data that has been written and thereby determine that serial controller 340 has completed its communication process with the selected external device interface. In other embodiments, controller 340 may provide an interrupt to microprocessor 310, which will inform microprocessor 310 that the communication process is complete.

The method 400 may be repeated by integrated circuit 300 whenever it is necessary to communicate with an external device interface that uses a different communication protocol, as represented by line 406 in FIG. 4. For example, at the conclusion of communicating with the FSB protocol, as has been described in the example above, microprocessor 310 may then desire to communicate with a SPI external device interface. If this were the case, the microprocessor 310 would write command request control data to first memory 320 that would indicate its desire to communicate with the SPI device. Controller 340 would read the command request and would be directed by the pointer to access the SPI configuration data found in dedicated memory block 330C. The controller 340 then would access the configuration data in this dedicated memory block and would process this configuration data as directed by the controller command that was found in the control data. For example, the control data may direct the controller to load and execute the configuration data. As described above, at this point in the process the controller 340 will be configured to communicate with a SPI external device interface. The controller may write data to and receive data from the external device interface. As mentioned, this process may be repeated as often as necessary. In this way, the method described enables a single controller to control communication with the multiple device interfaces.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for configuring a controller of an integrated circuit to facilitate communication with a plurality of external devices regardless of communication protocol, the method comprising:

an act of a processor internal to the integrated circuit transmitting control data to a first memory;
the control data including a controller command and a pointer to one of a plurality of dedicated memory blocks in a second memory;

an act of a controller internal to the integrated circuit reading the control data and in response to reading the control data, being directed by the pointer to access interface configuration data stored in one of a plurality of dedicated memory blocks and processing the interface configuration data as directed by the controller command, each of the plurality of dedicated memory blocks containing interface configuration data corresponding to a different one of a plurality of external device interfaces internal to the integrated circuit, the number of the plurality of dedicated memory blocks corresponding to a number of different communication protocols that are supported by the plurality of external device interfaces; and as a result of processing the interface configuration data, the controller being configured to communicate with a device externally coupled to the integrated circuit using a communication protocol of the number of different communication protocols supported by one of the plurality of external device interfaces,
wherein the interface configuration data includes:
a memory address and a device address for the externally coupled device; and
an address of a data area of a memory that indicates to the controller where to read data from or write data to as the controller communicates with the externally coupled device.

2. A method in accordance with claim 1, wherein the memory that the controller reads data from or writes data to contains the plurality of dedicated memory blocks.

3. A method in accordance with claim 1, wherein the configuration data includes an operation code directing the controller to read or write data received from the external device interface or provided to the external device interface, and wherein the configuration data includes the number of bytes of data to be transferred between the controller and the external device interface.

4. A method in accordance with claim 1, wherein the controller command performs at least one of saving the interface configuration data, loading the interface configuration data, or executing the interface configuration data.

5. A method in accordance with claim 1 further including:
an act of the controller writing a completion status command to a memory containing the memory blocks; and
an act of the processor polling the memory for the completion status command or receiving an interrupt.

6. A method in accordance with claim 1 further including:
an act of the controller communicating with the external device interface by sending data to and receiving data from the external device interface using the protocol supported by the external device interface.

7. A method in accordance with claim 1, further comprising:
an act of the controller selecting the externally coupled device for communication using data that uniquely identifies the externally coupled device.

8. A method in accordance with claim 1, further comprising:
an act of the controller writing data received from the externally coupled device to the data area indicated by the memory address included in the interface configuration data.

9. A method in accordance with claim 1, further comprising:
an act of the controller reading data from the data area indicated by the memory address included in the interface configuration data; and
an act of the controller transmitting the data read from the data area to the externally coupled device.

10. An integrated circuit comprising:
a microprocessor configured to transmit control data to a first memory;
the control data including a controller command and a pointer to one of a plurality of dedicated memory blocks in a second memory;
a plurality of external device interfaces each coupled to a device external to the integrated circuit and each supporting a different communication protocol;
each of the plurality of dedicated memory blocks containing interface configuration data corresponding to a different one of the plurality of external device interfaces, the number of the plurality of dedicated memory blocks corresponding to a number of different communication protocols that are supported by the plurality of external device interfaces; and
a controller configured to read the control data, and in response to reading the control data, being directed by the pointer to access the interface configuration data stored in one of the plurality of dedicated memory blocks, and process the accessed configuration data as directed by the controller command so as to configure the controller to communicate with a device externally coupled to the integrated circuit using one of the plurality of external device interfaces and a communication protocol of the number of different communication protocols supported by the external device interface,
wherein the microprocessor, the first memory, the controller, and the plurality of external device interfaces are internal to the integrated circuit,
wherein the interface configuration data includes:
a memory address and a device address for the externally coupled device; and
an address of a data area of a memory that indicates to the controller where to read data from or write data to as the controller communicates with the externally coupled device.

11. An integrated circuit in accordance with claim 10 further including:
the second memory configured to receive and store the control data generated by the microprocessor;
a memory access controller for facilitating controller access to the first memory and microprocessor access to the second memory.

12. An integrated circuit in accordance with claim 10, wherein the controller includes a master serial controller with direct memory access and a serializer/deserializer.

13. An integrated circuit in accordance with claim 10, wherein the integrated circuit is implemented in a laser transmitter/receiver.

14. An integrated circuit in accordance with claim 13, wherein the laser transmitter/receiver is one of a 1 G laser transceiver, 2 G laser transceiver, 4 G laser transceiver, 8 G laser transceiver, or 10 G laser transceiver.

15. An integrated circuit in accordance with claim 13, wherein the laser transmitter/receiver is a laser transceiver suitable for fiber channels greater than 10 G.

16. An integrated circuit in accordance with claim 13, wherein the laser transmitter/receiver is one of a 10 Gigabit Small Form Factor Pluggable (XFP) laser transceiver, a Small Form Factor Pluggable (SFP) laser transceiver, or a Small Form Factor (SFF) laser transceiver.

17. An integrated circuit in accordance with claim 10, wherein the controller is a state machine.

18. An integrated circuit in accordance with claim 10, wherein the communication protocols supported by the plurality of external device interfaces include a Serial Peripheral Interface (SPI) communication protocol and an I$^2$C communication protocol.

19. A computing architecture for configuring a controller to communicate with a plurality of external device interfaces comprising:
a register;
a microprocessor configured to write control data to the register;
the control data including a controller command and a pointer to one of a plurality of dedicated memory blocks in a system memory;
a plurality of external device interfaces each supporting a different communication protocol;

each dedicated memory block containing interface configuration data corresponding to a different one of the plurality of external device interfaces, the number of the plurality of dedicated memory blocks corresponding to a number of different communication protocols that are supported by the plurality of external device interfaces; and a controller configured to read the control data written in the register, and in response to reading the control data, being directed by the pointer to access the interface configuration data stored in one of the plurality of dedicated memory blocks, and process the interface configuration data as directed by the controller command so as to configure the controller to communicate with a device externally coupled to the integrated circuit using one of the plurality of external device interfaces and a protocol supported by the external device interface, wherein the microprocessor, the register, the system memory, the controller, and the plurality of external device interfaces are internal to an integrated circuit, wherein the interface configuration data includes:
a memory address and a device address for the externally coupled device; and
an address of a data area of a memory that indicates to the controller where to read data from or write data to as the controller communicates with the externally coupled device.

20. A computing architecture in accordance with claim 19 wherein the configuration data further includes at least one of an operation code directing the controller to read or write data from an external device, or the number of bytes of data to be transferred between the controller and the external device interface.

21. A computing architecture in accordance with claim 19, wherein the controller command performs at least one of saving the configuration data, loading the configuration data, or executing the configuration data.

* * * * *